(12) United States Patent
Wu

(10) Patent No.: US 11,778,525 B2
(45) Date of Patent: *Oct. 3, 2023

(54) CELL CONFIGURATION METHOD, TERMINAL, AND NETWORK NODE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,295

(22) Filed: Aug. 29, 2022

(65) Prior Publication Data

US 2022/0417805 A1 Dec. 29, 2022

Related U.S. Application Data

(63) Continuation of application No. 16/981,673, filed as application No. PCT/CN2019/077415 on Mar. 8, 2019, now Pat. No. 11,463,924.

(30) Foreign Application Priority Data

Mar. 16, 2018 (CN) .......................... 201810217502.8

(51) Int. Cl.
*H04W 36/00* (2009.01)
*H04W 36/08* (2009.01)

(52) U.S. Cl.
CPC ... *H04W 36/0077* (2013.01); *H04W 36/0061* (2013.01); *H04W 36/00837* (2018.08); *H04W 36/08* (2013.01)

(58) Field of Classification Search
CPC ......... H04W 36/0077; H04W 36/0061; H04W 36/00837; H04W 36/08; H04W 36/0069; H04W 36/36; H04W 36/00; H04W 36/24; H04W 36/0005; H04W 36/0011; H04W 36/0083

See application file for complete search history.

(56) References Cited

U.S. PATENT DOCUMENTS 11,463,924 B2 * 10/2022 Wu .................... H04W 36/0069
2015/0327094 A1 * 11/2015 Lee ....................... H04W 16/24
370/252

FOREIGN PATENT DOCUMENTS

WO WO-2017084685 A1 * 5/2017 ........ H04W 36/0069

* cited by examiner

*Primary Examiner* — Marisol Figueroa
(74) *Attorney, Agent, or Firm* — Maschoff Brennan

(57) ABSTRACT

A network node and a computer readable storage medium are provided. The network node includes a storage, a processor, and a computer program stored on the storage and executable by the processor, wherein when the computer program is executed by the processor, the processor implements: obtaining cell configuration information and trigger condition information; sending a configuration message to a terminal, wherein the configuration message comprises the cell configuration information and the trigger condition information.

15 Claims, 6 Drawing Sheets

CELL CONFIGURATION METHOD, TERMINAL, AND NETWORK NODE

CROSS-REFERENCE TO RELATED APPLICATION

This application is a continuation of a U.S. patent application Ser. No. 16/981,673 filed on Sep. 16, 2020, which is a U.S. national phase application of a PCT Application No. PCT/CN2019/077415 filed on Mar. 8, 2019, which claims a priority to Chinese Patent Application No. 201810217502.8 filed on Mar. 16, 2018, the disclosures of which are incorporated in their entirety by reference herein.

TECHNICAL FIELD

The present disclosure relates to the field of communications technology, in particular relates to a cell configuration method, a terminal, and a network node.

BACKGROUND

In a fifth-generation (5th generation, 5G) communication system, a dual connectivity (Dual Connectivity, DC) architecture is newly introduced. The DC architecture can include two cell groups, namely a master cell group (Master Cell Group, MCG) and a secondary cell group (Secondary Cell Group, SCG). The MCG corresponds to a master node (Master Node, MN) on a network side, and the SCG corresponds to a secondary node (Secondary Node, SN) on the network side. In addition, the MCG may include a primary cell (Primary Cell, PCell) and one or more secondary cells (Secondary Cell, SCell), and the secondary cell group may include a primary secondary cell (Primary Secondary Cell, PSCell), and one or more SCells. However, in current communications system, the terminal can only switch from one cell to another cell, but cannot realize flexible configuration of a cell of the terminal, such as adding, deleting or changing the cell. It can be seen that the flexible configuration of the cell of the terminal is currently an urgent technical problem to be solved.

SUMMARY

The embodiments of the present disclosure provide a cell configuration method, a terminal, and a network node, so as to solve the problem of flexibly configuring a cell of the terminal.

In order to solve the above technical problems, the present disclosure is implemented as follows.

A cell configuration method applied to a terminal includes: receiving a configuration message sent by a network, wherein the configuration message includes cell configuration information and trigger condition information; using the cell configuration information to perform cell configuration, in a case that the terminal meets the trigger condition information.

In a first aspect, the embodiments of the present disclosure also provide a cell configuration method applied to a terminal. The terminal includes: receiving a configuration message sent by a network, wherein the configuration message includes cell configuration information and trigger condition information; using the cell configuration information to perform cell configuration, in a case that the terminal meets the trigger condition information.

In a second aspect, the embodiments of the present disclosure provide a cell configuration method applied to a source node or a target node. The method includes obtaining cell configuration information and trigger condition information; sending a configuration message to a terminal, wherein the configuration message includes the cell configuration information and the trigger condition information In the third aspect, the embodiments of the present disclosure provide a terminal. The terminal includes a reception module, used for receiving a configuration message sent by a network, wherein the configuration message includes cell configuration information and trigger condition information; a configuration module, used for using the cell configuration information to perform cell configuration, in a case that the terminal meets the trigger condition information. Receiving the configuration message sent by the target node through the source node.

In a fourth aspect, the embodiments of the present disclosure provide a network node, wherein the network node is a source node or a target node, and the network node includes: an obtaining module, used for obtaining cell configuration information and trigger condition information; a sending module, used for sending a configuration message to a terminal, wherein the configuration message includes the cell configuration information and the trigger condition information.

In a fifth aspect, the embodiment of the present disclosure provide a terminal. The terminal includes a storage, a processor, and a computer program stored on the storage and executable by the processor, wherein when the computer program is executed by the processor, the processor implements steps in the cell configuration method at the terminal side provided in the embodiments of the present disclosure.

In a sixth aspect, the embodiment of the present disclosure provide a network node. The network node is a source node or a target node. The network node includes a storage, a processor, and a computer program stored on the storage and executable by the processor, wherein when the computer program is executed by the processor, the processor implements steps in the cell configuration method at the network node side provided in the embodiments of the present disclosure.

In a seventh aspect, the embodiments of the present disclosure provide a computer readable storage medium having a computer program stored on the computer readable storage medium, wherein, when the computer program is executed by a processor, the processor implements the steps in the cell configuration method at the terminal side provided in the embodiments of the present disclosure, or when the computer program is executed by a processor, the processor implements the steps in the cell configuration method at the network node side provided in the embodiments of the present disclosure.

In the embodiment of the present disclosure, a configuration message sent by the network is received, wherein the configuration message includes cell configuration information and trigger condition information; in a case that the terminal meets the trigger condition information, the cell configuration information is used to perform cell configuration. Thus, it is possible to flexibly configure the cell of the terminal to improve the communication performance of the terminal.

DETAILED DESCRIPTION

The technical solutions in the embodiments of the present disclosure will be described clearly and completely with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative work fall within the protection scope of the present disclosure. In the description and claims, "and/or" means at least one of objects connected by the "and/or".

Figure 1:
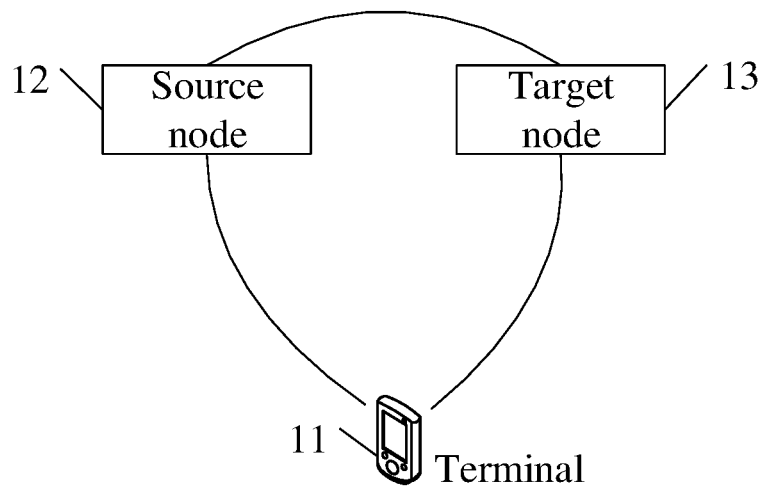
FIG. 1 is a structural diagram of a network system to which an embodiment of the present disclosure is applicable.

Referring to FIG. 1. FIG. 1 is a structural diagram of a network system to which an embodiment of the present disclosure is applicable. As shown in FIG. 1, the network system includes a terminal 11, a source node 12, and a target node 13. The terminal 11 may also be referred to as a terminal device or a user terminal (User Equipment, UE), and the terminal 11 may be a mobile phone, a tablet computer (Tablet Personal Computer), a laptop computer (Laptop Computer), or a personal digital assistant (Personal Digital Assistant, PDA), a mobile Internet device (Mobile Internet Device, MID), a wearable device (Wearable Device) or a vehicle-mounted device and other terminal-side devices. It should be noted that a specific type of terminal 11 is not limited in the embodiments of the present disclosure. The aforementioned source node 12 may be one of network nodes currently connected to the terminal 11, for example, if the network nodes currently connected to the terminal 11 include an MN and an SN, the aforementioned source node 12 may be one of the MN and the SN. The aforementioned target node 13 may be a network node of the network nodes currently connected to the terminal 11, or a network node not currently connected to the terminal 11. Because, in the embodiments of the present disclosure, cell configuration performed by a terminal 11 may include at least one of configurations of adding a cell, deleting a cell, and changing a cell. Then, the terminal 11 may delete a connection with the target node 13 during a process of the cell configuration, or establish a connection with the target node 13. In addition, the network structure applied in the embodiments of the present disclosure may include one or more target nodes 13, wherein one target node 13 is taken as an example in the figures.

In addition, in the embodiments of the present disclosure, the network node may be a base station (for example: 5G NR NB) of a 5G and later versions, or a base station in other communications systems, or called Node B, Evolved Node B, or MN, or SN, or other words in the field, as long as the same technical effect is achieved, the base station is not limited to specific technical words.

In addition, the embodiments of the present disclosure may be applied to a DC architecture. The DC architecture may include two cell groups, namely an MCG and an SCG, the MCG corresponds to the MN on the network side, and the SCG corresponds to the SN on the network side. In addition, the MCG may include one PCell and one or more SCells, and the secondary cell group may include one PSCell and one or more SCells, wherein PCell and PSCell may also be collectively referred to as SpCell.

It should be noted that specific functions of the terminal 11, the source node 12, and the target node 13 in the embodiments of the present disclosure will be described in detail through the following embodiments.

Figure 2:
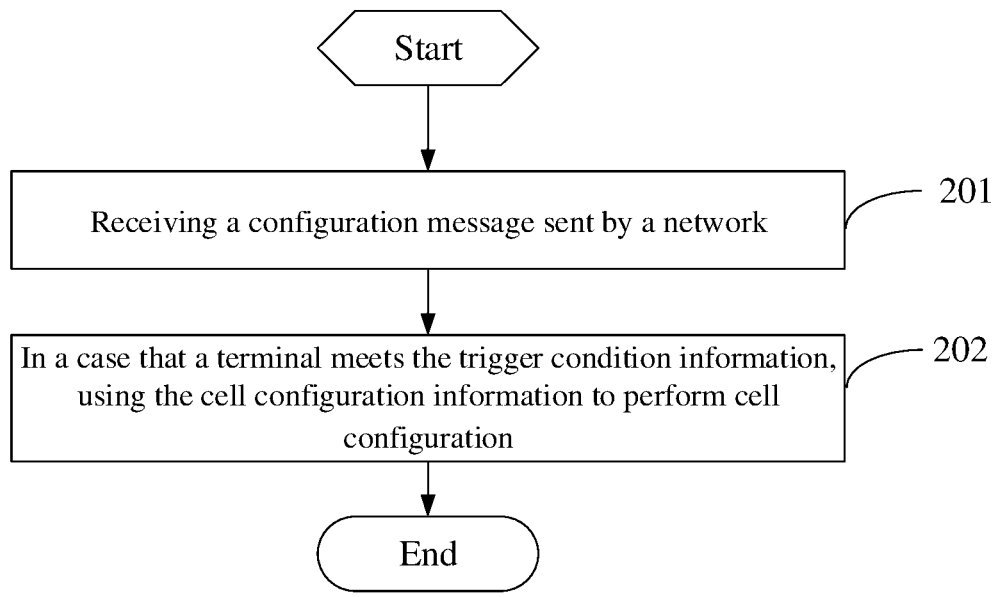
FIG. 2 is a flowchart of a cell configuration method provided by an embodiment of the present disclosure.

Referring to FIG. 2. FIG. 2 is a flowchart of a cell configuration method provided by an embodiment of the present disclosure. The method is applied to a terminal. As shown in FIG. 2, the method includes the following steps.

Step 201: receiving a configuration message sent by the network, wherein the configuration message includes cell configuration information and trigger condition information.

The above configuration message may be a radio resource control (Radio Resource Control, RRC) message. Of course, this embodiment of the present disclosure is not limited thereto, for example, the configuration message may also be other downlink messages.

In addition, the foregoing configuration message may include one or more pieces of cell configuration information and one or more pieces of trigger condition information, and there is a correspondence relationship between the cell configuration information and the trigger condition information. The aforementioned trigger condition information may be used to indicate that when the terminal meets a certain trigger condition, corresponding cell configuration information may be used for cell configuration, and the cell configuration information may be configuration of a corresponding cell when the terminal performs cell configuration. For example, the above trigger condition information indicates a measurement result threshold, and the above cell configuration information is a configuration of a corresponding target cell when the terminal adds, deletes, or changes the target cell. In this way, when a measurement result of the terminal meets the measurement result threshold, the terminal uses the corresponding cell configuration information to add, delete or change the target cell.

In addition, receiving the configuration message sent by the network may include receiving the configuration message sent by a source node.

Wherein, before the source node sends the above configuration message, the source node may negotiate with one or more target nodes to determine the trigger condition information and the cell configuration information. The negotiation here may be signaling interaction performed among the source node and the one or more target nodes to determine the trigger condition information and the cell configuration information. In addition, since the cell configuration information here is determined through the negotiation between the source node and the target node, the cell configuration information corresponds to a target cell of the target node. The cell configuration information can also be referred to as the configuration information of the target cell, i.e., the cell configuration information may be configuration of the corresponding target cell when the terminal performs cell configuration (adding, deleting or changing operations) on the target cell.

For example, after the source node receives the configuration information of the target cell of one or more target nodes, the source node associates the trigger condition information with the configuration information of the target cell, and after the association, the source nodes sends the trigger condition information and the configuration information of the target cell through the above configuration message. It should be noted that one target node may correspond to configuration information of one or more target cells. In addition, in the embodiments of the present disclosure, the target cell can be understood as a cell involved in the process of cell configuration performed by the terminal. For example, if the cell configuration is to delete a cell, the deleted cell can be the target cell; or the cell configuration is to add a cell, then the added cell can be the target cell, or if the cell configuration is to change to a cell, the cell after the change can be the target cell.

By receiving the configuration message sent by the source node, the terminal can receive the trigger condition information and the cell configuration information corresponding to one or more target nodes through the source node, thereby saving a transmission overhead.

Of course, the foregoing receiving the configuration message sent by the network may also include: receiving the configuration message sent by the target node through the source node.

Similarly, before sending the configuration message, the target node may negotiate with the source node to determine the trigger condition information and the cell configuration information. In addition, since the cell configuration information here is determined through negotiation between the target node and the source node, the cell configuration information corresponds to the target cell of the target node. The cell configuration information can also be referred to as the configuration information of the target cell, i.e., the cell configuration information may be the configuration information of the corresponding target cell when the terminal performs cell configuration (adding, deleting or changing operations) on the target cell. In addition, the foregoing target node may correspond to one or more pieces of cell configuration information, and different pieces of cell configuration information may correspond to different target cells.

For example, after the target node receives from the source node one or more pieces of request information of cell management triggered according to a condition, the target node associates the trigger condition information with the configuration information of the target cell, and after the association is performed, the target node sends the association to the terminal (UE) through an RRC message.

Since the configuration message sent by the target node through the source node is received, it can be realized that the configuration message is issued by the target node. The configuration message can be transparent to the source node and only needs to be forwarded or transparently transmitted, so that complexity and power consumption of the source node may be reduced.

In addition, in the embodiments of the present disclosure, the above-mentioned source node and target node may be a source base station (or called a source MN) and a target base station (or called a target MN) in the process of cell configuration (or may be referred to as the a handover process), respectively; or the source SN and the target SN in the DC; or the source MN and the target SN in the DC, etc., which are not limited in the present disclosure.

Step 202: in a case that the terminal meets the trigger condition information, using the cell configuration information to perform the cell configuration.

After receiving the above configuration message, the terminal can perform condition evaluation according to configuration of the network, and in a case that the terminal meets certain trigger condition information, the corresponding cell configuration information is used for the cell configuration. The cell configuration may be at least one of operations of deleting, adding, and changing a cell. Here, the deleting operation may be deletion of a target cell, the adding operation may be addition of a target cell, and the above-mentioned changing operation may be change from the source cell to the target cell.

It should be noted that, in the embodiments of the present disclosure, performing cell configuration may be configuring a target cell, for example, adding a target cell, deleting a target cell, or changing to a target cell. In addition, because the cell configuration is performed based on the trigger condition information, the embodiments of the present disclosure can realize that the trigger condition is used to change a cell, and the terminal can autonomously configure a cell according to the trigger condition information to achieve flexible cell configuration (or called management) and to improve a communication performance of the terminal. Since a trigger condition is used for the cell configuration, the cell in the embodiments of the present disclosure may be called a conditional cell, which is used for a cell managed conditionally.

It should be noted that the above-mentioned method provided in the embodiments of the present disclosure can be applied to 5G systems, but the present disclosure is not limited thereto; as long as the basically same function may be achieved, the method is suitable for other communications systems, for example: a sixth generation (6G) system or other communication systems to which cell configuration is applicable.

In this embodiment, a configuration message sent by the network is received, wherein the configuration message includes the cell configuration information and the trigger condition information; in a case that the terminal meets the trigger condition information, the cell configuration information is used for cell configuration. Thus, it is possible to flexibly configure the cell of the terminal so as to improve the communication performance of the terminal.

Figure 3:
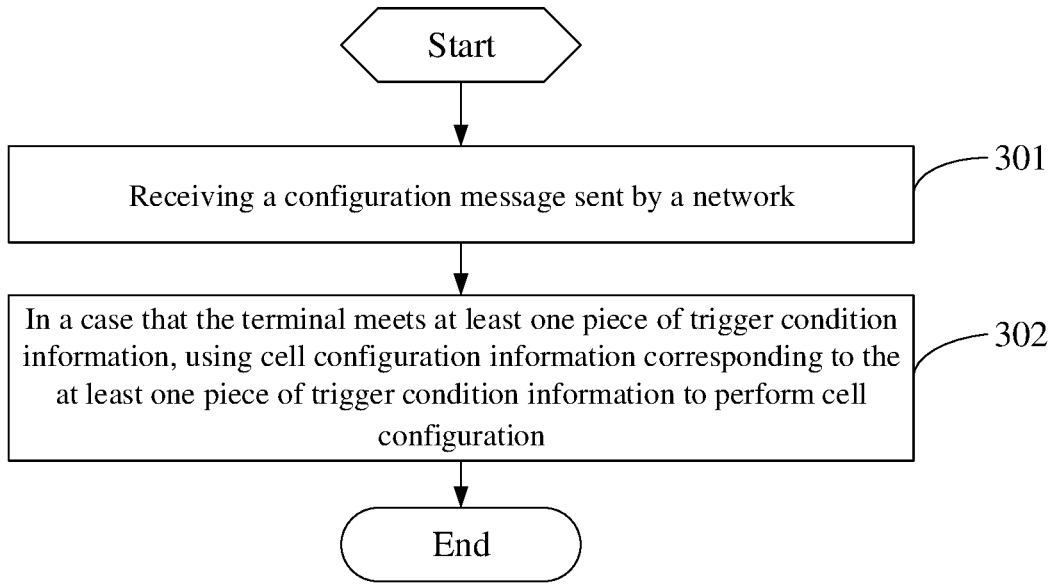
FIG. 3 is a flowchart of another cell configuration method provided by an embodiment of the present disclosure.

Referring to FIG. 3. FIG. 3 is a flowchart of another cell configuration method provided by an embodiment of the present disclosure. The method is applied to a terminal. As shown in FIG. 3, the method includes the following steps.

Step 301: receiving a configuration message sent by a network, wherein the configuration message includes one or more pieces of cell configuration information and one or more pieces of trigger condition information.

An association relation exists between the cell configuration information and the trigger condition information included in the configuration message. For example, one piece of trigger condition information corresponds to one or more pieces of cell configuration information, so that when one piece of trigger condition information is met, one or more pieces of cell configuration information may be used for cell configuration; or one piece of cell configuration information corresponds to one or more pieces of trigger condition information, so that when one piece of trigger condition information can be satisfied, or when one or more pieces of multiple pieces of trigger condition information are satisfied, the terminal can use the corresponding cell configuration information for cell configuration. In addition, one piece of cell configuration information may correspond to one or more target cells.

As an optional implementation, the configuration message includes a trigger condition information list (for example: list Of Condition), a cell configuration information list (list Of Config), and an association relation list (list Of Relation), wherein the trigger condition information list includes one or more pieces of trigger condition information, the cell configuration information list includes one or more pieces of cell configuration information, and the association relation list includes an association relation between the trigger condition information and the cell configuration information; or the configuration message includes a trigger condition list, wherein each item in the trigger condition list includes the trigger condition information and the cell configuration information corresponding to the trigger condition information.

Each item in the trigger condition information list may include one piece of trigger condition information, and each item in the cell configuration information list may include one piece of cell configuration information, and each item in the association relation list may include an association relation.

In addition to the trigger condition information, each item in the trigger condition information list may also include identification information. For example, each item in the trigger condition information list includes the trigger condition information and identification information (e.g., condition ID) corresponding to the trigger condition information. In this way, the trigger condition information can be identified through the identification information of the trigger condition information, or the trigger condition information can be associated with the cell configuration information through the identification information.

In the same way, each item in the cell configuration information list includes the cell configuration information, and may also include the identification information (e.g., reconfiguration ID) corresponding to the cell configuration information. In this way, the cell configuration information can be identified through the identification information of the cell configuration information, or the cell configuration information can be associated with the trigger condition information through the identification information.

The above-mentioned association relation may include: an association relation between the identification information corresponding to the trigger condition information and the identification information corresponding to the cell configuration information; or an association relation between the identification information corresponding to the trigger condition information and an item label of the cell configuration information list; an association relation between an item label of the trigger condition information list and the identification information corresponding to the cell configuration information; or an association relation between an item label of the trigger condition information list and an item label of the cell configuration information list.

The item label in this embodiment may indicate an item in a list, for example: a first item of the list is a label 1, a second item of the list is a label 2, and so on.

Through the multiple association relations provided above, it is possible to flexibly associate the trigger condition information with the cell configuration information to improve flexibility.

In this embodiment, it is possible to correctly associate the trigger condition information with the cell configuration information through the above trigger condition information list, the cell configuration information list, and the association relation list, so that the terminal can be configured correctly, and more flexibly configure the association relation between the trigger condition information and the cell configuration information. In addition, the above trigger condition list includes one or more items, so that the trigger condition list can include one or more pieces of cell configuration information and one or more pieces of trigger condition information, because a one-to-one relation may exist between the trigger condition information and the cell configuration information, or a one-to-many relation may exist between the trigger condition information and the cell configuration information, or a many-to-one relation may exist between the trigger condition information and the cell configuration information.

In addition, in the above embodiment, it can also be realized that only one trigger condition list is included, because each item includes the trigger condition information and the cell configuration information corresponding to the trigger condition information. For example, different items include different pieces of trigger condition information and the cell configuration information corresponding to the trigger condition information. In this way, it is possible to correctly associate the trigger condition information with the cell configuration information through a list, so that the terminal can be configured correctly, thereby configuring more flexibly the association between the trigger condition information and the cell configuration information, and saving a signaling transmission overhead.

The above trigger condition list may include at least one of the following: a first condition item, a second condition item and a third condition item.

The first condition item includes one piece of trigger condition information and one piece of cell configuration information corresponding to the piece of trigger condition information; the second condition item includes one piece of trigger condition information and multiple pieces of cell configuration information corresponding to the piece of trigger condition information; or the third condition item includes one piece of cell configuration information and one or more pieces of trigger condition information corresponding to the piece of cell configuration information.

Through the above first condition item, the one-to-one relation between the trigger condition information and the cell configuration information can be realized, so that when a terminal meets a certain piece of trigger condition information, the corresponding cell configuration information can be used for cell configuration, for example: delete a target cell, or add a target cell, or change to a target cell, etc.

Through the above second condition item, the one-to-many relation between the trigger condition information and the cell configuration information can be realized, so that when the terminal meets a certain piece of trigger condition information, the corresponding multiple pieces of cell configuration information can be used for cell configuration, for example: delete multiple target cells, or add multiple target cells, or delete one target cell, add another target cell, etc.

Through the above third condition item, a many-to-one or one-to-one association relation between the trigger condition information and the cell configuration information can be realized, so that when the terminal satisfies this trigger condition information or one or more of the multiple pieces of trigger condition information, the cell configuration information can be used for cell configuration, for example: delete a target cell, or add a target cell, or change to a target cell, etc.

It should be noted that the trigger condition list including at least one of the first condition item, the second condition item, and the third condition item can be understood that all of the condition items in the trigger condition list are the first condition item, or the second condition item, or the third condition item, or a part of the condition items in the trigger condition list may be the first condition item, or a part of the condition items in the trigger condition list may be the second condition item, or a part of the condition items in the trigger condition list may be the third condition item.

Through the first condition item, the second condition item and the third condition item, it is possible to flexibly associate the trigger condition information with the cell configuration information in different situations through the trigger condition list, so as to improve flexibility of the association between the trigger condition information and the cell configuration information.

In addition, in this embodiment, in order to simplify an implementation process of the source node and reduce complexity of the source node, it can be configured that the above configuration message has at least one of following configurations: trigger condition information of different items in the trigger condition information list being configured in different information containers, respectively; cell configuration information of different items in the cell configuration information list being configured in different information containers, respectively; trigger condition information of different items in the trigger condition list being configured in different information containers, respectively; cell configuration information of different items in the trigger condition list being configured in different information containers, respectively; contents of different items in the trigger condition list being configured in different information containers, respectively and the contents include the trigger condition information and the cell configuration information corresponding to the trigger condition information.

The trigger condition information of different items in the trigger condition information list being configured in different information containers, respectively may be that the trigger condition information of each item in the trigger condition information list is separately configured in one information container, for example, the above configuration message includes multiple condition information containers (for example: container(condition)), and the multiple condition information containers are configured with multiple pieces of trigger condition information respectively.

The cell configuration information of different items in the cell configuration information list being configured in different information containers respectively may be that the cell configuration information of each item in the cell configuration information list is separately configured in one information container, for example: the above configuration message includes multiple configuration information containers (for example: container (RRC Reconfiguration)), and the multiple configuration information containers respectively configure multiple cell configuration information.

The trigger condition information and cell configuration information in the trigger condition list can be obtained by referring to corresponding descriptions of the trigger condition information list and the cell configuration information list, which will not be repeated here.

The contents of different items in the trigger condition list being configured in different information containers may be that the content of each item in the trigger condition list (the trigger condition information and the cell configuration information corresponding to the trigger condition information) is separately configured in one information container. That is, each information container is configured with trigger condition information and cell configuration information associated with the trigger condition information.

Since the configuration message satisfies at least one of the above-mentioned conditions, at least one of the cell configuration information and the trigger condition information can be configured in the information container, so that at least one of the cell configuration information and the trigger condition information is transparent to the source node, thus simplifying an implementation process of the source node and reducing complexity of the source node, since the source node does not need to obtain specific content thereof.

It should be noted that implementations of the trigger condition information list, the cell configuration information list, and the association relation list, and the trigger condition list described in this embodiment can also be applied to the embodiment shown in FIG. 2 and can achieve the same beneficial effects.

Step 302: in a case that the terminal meets at least one piece of trigger condition information, using cell configuration information corresponding to the at least one piece of trigger condition information to perform cell configuration.

The above at least one piece of trigger condition information may be any one or more pieces of trigger condition information in the configuration message received in step 301.

Through this step, it is possible for the terminal to use, according to the association relation between the trigger condition information and the cell configuration information configured by the network, configuration of the target cell associated with the trigger condition information when triggering one or more pieces of trigger condition information. For example: the terminal satisfies the trigger condition information 'a', and the cell configuration information corresponding to the trigger condition information 'a' is the configuration information of the target cell 'a', so that the terminal uses the configuration information of the target cell 'a' to configure the target cell 'a' when the trigger condition information 'a' is satisfied, for example: to delete the target cell 'a', or to add the target cell 'a', or to change to the target cell 'a', etc.

In this embodiment, a variety of optional implementations are added on a basis of the embodiment shown in FIG. 2, and all of the optional implementations can realize flexible configuration of the cell of the terminal, so as to improve the communications performance of the terminal, and also to achieve beneficial effects of improving flexibility of association between the trigger condition information and the cell configuration information and reducing the complexity of the source node.

Figure 4:
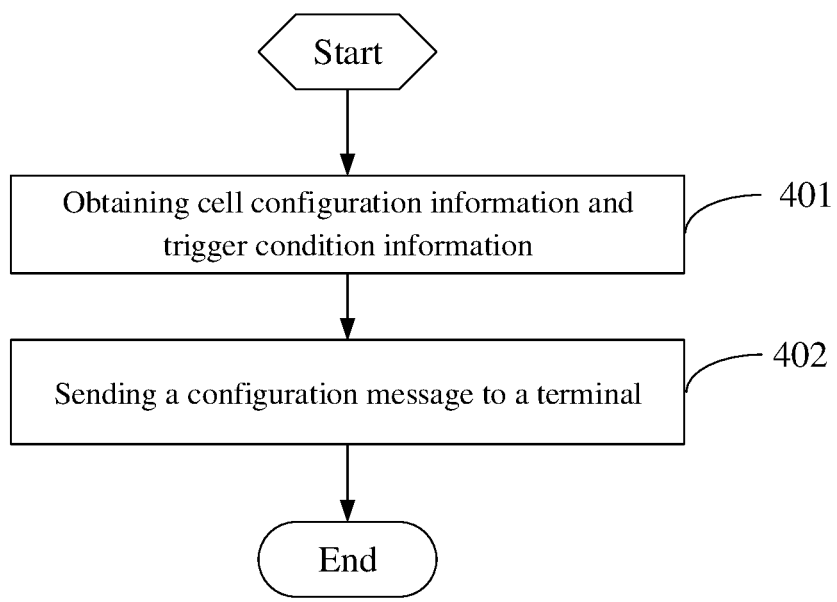
FIG. 4 is a flowchart of another cell configuration method provided by an embodiment of the present disclosure.

Referring to FIG. 4. FIG. 4 is a flowchart of another cell configuration method provided by an embodiment of the present disclosure. The method is applied to a source node or a target node. As shown in FIG. 4, the method includes the following steps.

Step 401: obtaining cell configuration information and trigger condition information.

Step 402: sending a configuration message to the terminal, wherein the configuration message includes the cell configuration information and the trigger condition information.

Optionally, the configuration message includes: one or more pieces of cell configuration information and one or more pieces of trigger condition information.

Optionally, the configuration message includes a trigger condition information list, a cell configuration information list, and an association relation list, wherein the trigger condition information list includes one or more pieces of trigger condition information, and the cell configuration information list includes one or more pieces of cell configuration information, and the association relation list includes an association relation between the trigger condition information and the cell configuration information; or the configuration message includes a trigger condition list, wherein each item in the trigger condition list includes trigger condition information and cell configuration information corresponding to the trigger condition information.

Optionally, each item in the trigger condition information list includes trigger condition information and identification information corresponding to the trigger condition information; each item in the cell configuration information list includes cell configuration information and identification information corresponding to the cell configuration information.

The association relation includes: an association relation between the identification information corresponding to the trigger condition information and the identification information corresponding to the cell configuration information; or an association relation between the identification information corresponding to the trigger condition information and an item label of the cell configuration information list; or an association relation between an item label of the trigger condition information list and identification information corresponding to the cell configuration information; or an association relation between an item label of the trigger condition information list and an item label of the cell configuration information list.

Optionally, the trigger condition list includes at least one of the following: a first condition item, a second condition item and a third condition item, wherein, the first condition item includes one piece of trigger condition information and one piece of cell configuration information corresponding to the piece of trigger condition information; the second condition item includes one piece of trigger condition information and multiple pieces of cell configuration information corresponding to the piece of trigger condition information; or the third condition item includes one piece of cell configuration information and one or more pieces of trigger condition information corresponding to the piece of cell configuration information.

Optionally, the configuration message has at least one of following configurations: trigger condition information of different items in the trigger condition information list being configured in different information containers, respectively; cell configuration information of different items in the cell configuration information list being configured in different information containers, respectively; trigger condition information of different items in the trigger condition list being configured in different information containers, respectively; cell configuration information of different items in the trigger condition list being configured in different information containers, respectively; contents of different items in the trigger condition list being configured in different information containers, respectively and the contents include the trigger condition information and the cell configuration information corresponding to the trigger condition information.

Optionally, in a case that the method is applied to the target node, the cell configuration information and the trigger condition information are determined through negotiation between the target node and the source node; or in the case where the method is applied to the source node, the cell configuration information and the trigger condition information are determined by the source node and one or more target nodes through negotiation.

Optionally, in a case that the method is applied to the target node, the target node sends the configuration message to the terminal through the source node.

It should be noted that this embodiment is used as an implementation of a source node or a target node corresponding to the embodiment shown in FIG. 2 and FIG. 3, and the specific implementation of this embodiment can be obtained by referring to related description of the embodiments shown in FIG. 2 and FIG. 3 and the same beneficial effect may be achieved. In order to avoid repetitive description, the description will not be repeated here.

Figure 5:
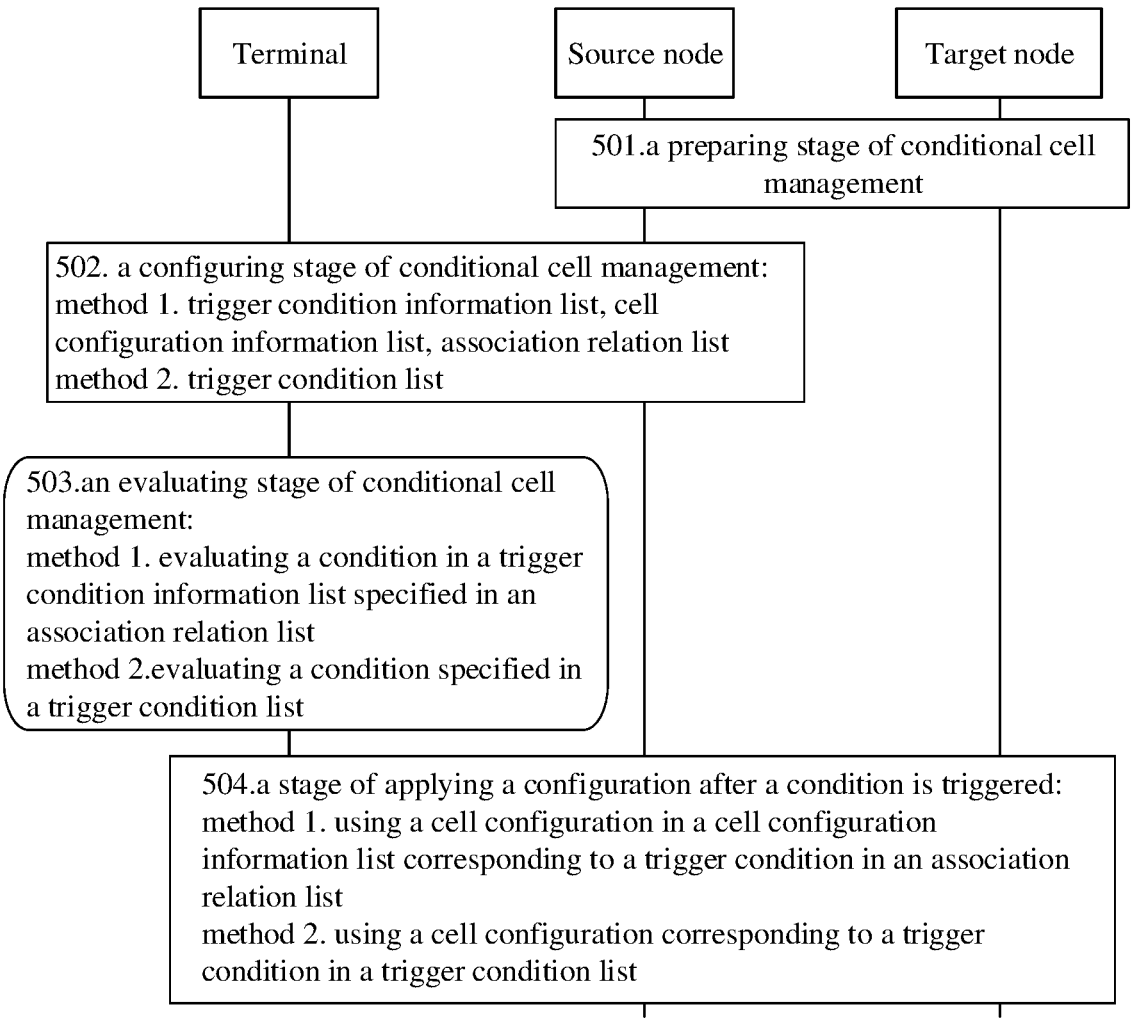
FIG. 5 is a schematic diagram of another cell configuration method provided by an embodiment of the present disclosure.

Referring to FIG. 5, FIG. 5 is a schematic diagram of another cell configuration method provided by an embodiment of the present disclosure. The source node and the target node in FIG. 5 may be a source base station and a target base station in a handover process, or a source SN and a target SN in DC; or a source MN and a target SN in DC. As shown in FIG. 5, the method includes the following steps.

501. the source node and the target node negotiate "trigger condition information" and "configuration information of a target cell" for conditional cell management.

The "conditional cell management" can mean that the network side configures the "trigger condition information" and the "configuration information of a target cell" for the terminal, and after the terminal evaluates that a configured trigger condition is satisfied, the terminal performs an operation of adding a target cell, deleting a target cell or changing to a target cell, according to the configuration information of the target cell configured by the network. The evaluation of the "trigger condition" by the terminal may include evaluation of measurement results of one or more cells by the terminal, for example: a measurement result value of a certain cell meets a configured threshold. The above-mentioned "configuration information of a target cell" may be configuration of the corresponding target cell when the terminal performs the operations of adding the target cell, deleting the target cell or changing the target cell, in a case that the trigger condition is met.

502. after receiving the configuration information of one or more conditionally triggered target cells of one or more target nodes, the source node on the network side associates the "triggering condition information" with the "configuration information of a target cell" and an RRC message is sent to the terminal thereafter. A method of associating the "trigger condition information" with the "configuration information of a target cell" configured by the RRC message is as follows:

Method 1: (Multiple list association)

The configuration includes the following list:

A trigger condition list (for example, list Of Condition), a target cell configuration list (for example, list Of Config) and an association relation list (for example, list Of Relation)

The above-mentioned "trigger condition list" can also be referred to as a trigger condition information list. Each item of the "trigger condition list" includes "trigger condition information" for conditional cell management, and additionally can also include an identifier (for example, condition ID) corresponding to the "trigger condition information".

Each item of the "target cell configuration list" includes "configuration information of the target cell" used for conditional cell management, and additionally may also include an identifier (e.g, reconfiguration ID) corresponding to the "configuration information of a target cell".

The "association relation list" is used to indicate the association relation between the "trigger condition information" and the "configuration information of a target cell", and the association relation in each item includes at least one of the following: an identifier corresponding to the "trigger condition information" and an identifier corresponding to the "target cell configuration information"; an identifier corresponding to the "trigger condition information" and a list item label of the "target cell configuration list" (for example, the first item in the list is "label 1"); a list item label of the "trigger condition list" (for example, the first item of the list is "label 1") and an identifier corresponding to the "configuration information of a target cell"; a list item label of the "trigger condition list" (for example, the first item of the list is "label 1") and a list item label of the "target cell configuration list" (for example, the first item of the list is "label 1"); wherein, the "trigger condition information" in each item of the "trigger condition list" may be contained in an information container (for example, container (RRC Reconfiguration)); the "configuration information of a target cell" in each item of the "target cell configuration list" may be contained in an information container (for example, container (RRC Reconfiguration)).

Method 2.1: (single-list association, a condition corresponds to a configuration in a one-to-one correspondence)

The configuration includes a following list: a trigger condition list (for example, list Of Condition), wherein, each item of the "trigger condition list" includes a "trigger condition information" and a "target cell configuration information" for condition cell management.

The "trigger condition information" in each item of the "trigger condition list" may be contained in an information container (for example, container(condition)).

The "configuration information of a target cell" in each item of the "triggering condition list" may be contained in an information container (for example, container (RRC Reconfiguration)).

Each item of the "trigger condition list" can be contained in an information container.

Method 2.2: (single-list association, a condition corresponds to multiple configurations in a one-to-many correspondence)

The configuration includes the following list: a trigger condition list (for example, list Of Condition), wherein, each item of the "trigger condition list" includes a "trigger condition information" and one or more "target cell configuration information" used for conditional cell management.

The "trigger condition information" in each item of the "trigger condition list" may be contained in an information container (for example, container(condition)).

The "configuration information of a target cell" in each item of the "trigger condition list" may be contained in an information container (for example, container (RRC Reconfiguration)).

Each item of the "trigger condition list" can be contained in an information container.

Method 2.3: (single-list association, multiple conditions correspond to a configuration in a many-to-one correspondence)

The configuration includes the following list: a trigger condition list (for example, list Of Condition), wherein, each item of the "trigger condition list" includes one or more "trigger condition information" and one "target cell configuration information of a target cell" used for conditional cell management.

The "trigger condition information" in each item of the "trigger condition list" may be contained in an information container (for example, container(condition)).

The "configuration information of a target cell" in each item of the "trigger condition list" may be contained in an information container (for example, container (RRC Reconfiguration)).

Each item of the "trigger condition list" can be contained in an information container.

In step 502, two methods can be used to correctly indicate the association relation between the trigger condition information and the configuration information of a target cell. First method: the network side configures the trigger condition list and the configuration information list of a target cell, and the network side configures the association relation list of cell configuration information and a trigger condition. According to the association relation list configured by the network, the terminal adopts configuration of the target cell associated with the condition when the terminal triggers a certain condition. Second method: the network side configures a list, and each item in the list includes configuration information of the target cell and a trigger condition corresponding to the configuration information of the target cell. The terminal adopts the configuration information of the target cell corresponding to a certain condition when triggering the condition according to the list information.

503. the terminal evaluates conditions according to configuration of the network side, and the evaluation method includes methods 1 and 2 as follow.

Method 1 (corresponding to the method 1 in step 2): the UE evaluates corresponding conditions in the "target cell configuration list" specified in the "association relation list", or evaluates corresponding conditions in the "trigger condition list".

Method 2 (corresponding to the methods 2.1-2.3 in step 2): the UE evaluates corresponding conditions in the "trigger condition list".

504. according to step 3, after the terminal meets the trigger condition, the terminal applies a configuration corresponding to the condition, and the method of applying configuration includes methods 1 and 2 as follow.

Method 1 (corresponding to the method 1 in step 2): the UE adopts configuration of a corresponding target cell in the "trigger condition list" specified in the "association relation list".

Method 2 (corresponding to the methods 2.1-2.3 in step 2): the UE evaluates configuration of a corresponding target cell in the "trigger condition list".

Using the method of this embodiment, a trigger condition and a cell configuration can be correctly associated after a condition trigger is used to change a cell, so that the terminal can be configured correctly, and more flexible association configuration between a trigger condition and a cell configuration can be realized.

Figure 6:
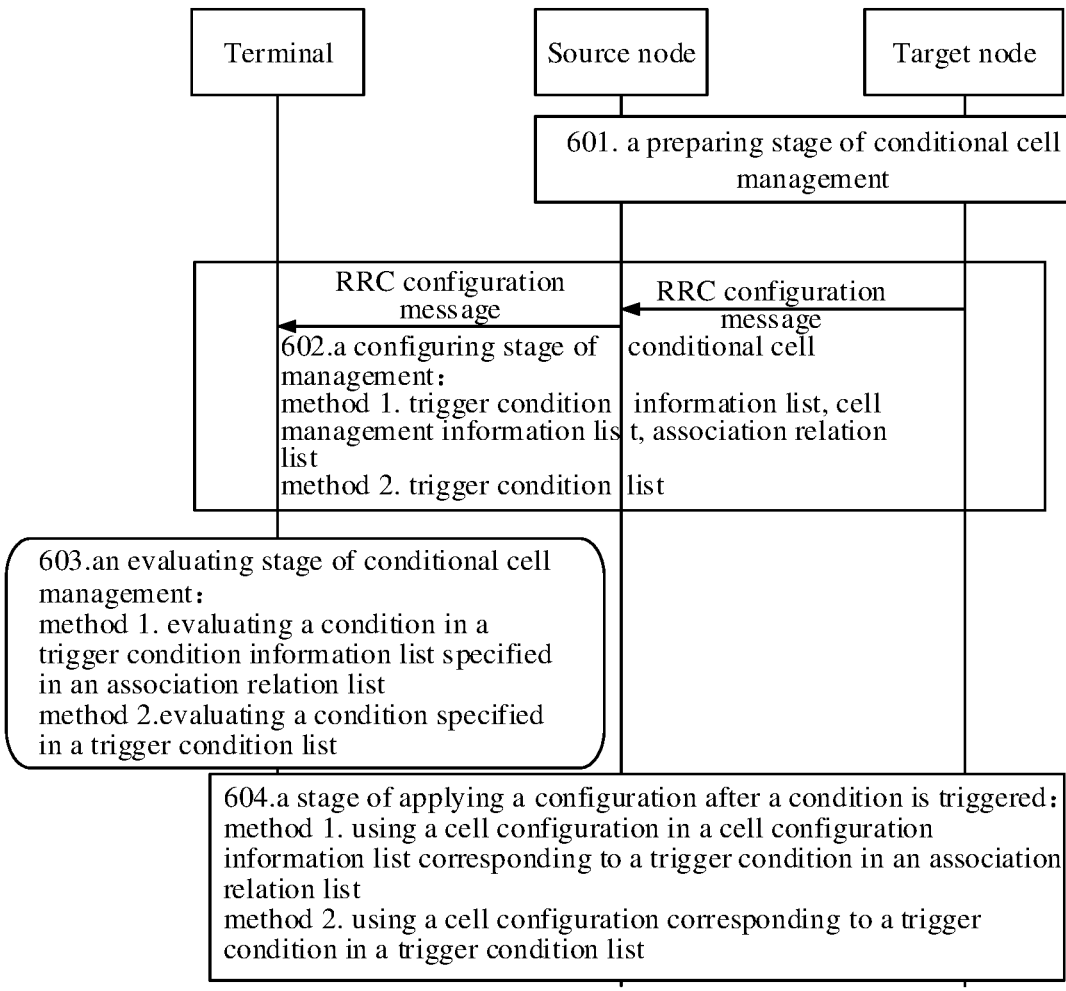
FIG. 6 is a schematic diagram of another cell configuration method provided by an embodiment of the present disclosure.

Referring to FIG. 6, FIG. 6 is a schematic diagram of another cell configuration method provided by an embodiment of the present disclosure. The source node and the target node in FIG. 6 may be: a source base station and a target base station in a handover process, or a source SN and a target SN in DC; or a source MN and a target SN in DC. As shown in FIG. 6, the method includes the following steps.

601. this step is same as step 501 in the embodiment shown in FIG. 5, which is not repeated here.

602. after receiving, from the source node, request information of one or more conditionally triggered cell management, the target node on the network side associates the "triggering condition information" with the "configuration information of a target cell" and an RRC message is sent to the terminal thereafter. A method of associating the "trigger condition information" with the "configuration information of a target cell" configured by the RRC message is the same as the step 502 in the embodiment shown in FIG. 5.

The RRC configuration information can be forwarded to the UE through the source node.

603. this step is the same as step 503 in the embodiment shown in FIG. 5, which is not repeated here.

604. this step is the same as step 504 in the embodiment shown in FIG. 5, which is not repeated here.

Using the method of this embodiment, a trigger condition and a cell configuration can be correctly associated after a condition trigger is used to change a cell, so that the terminal can be configured correctly, and more flexible association configuration between a trigger condition and a cell configuration can be realized.

Figure 7:
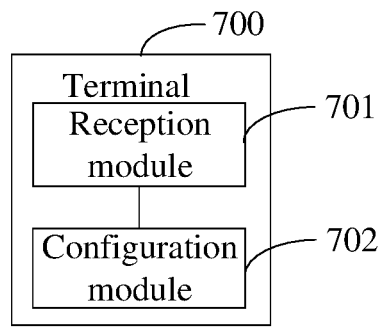
FIG. 7 is a structural diagram of a terminal provided by an embodiment of the present disclosure.

Referring to FIG. 7. FIG. 7 is a structural diagram of a terminal provided by an embodiment of the present disclosure. As shown in FIG. 7, the terminal includes a reception module 701 and a configuration module 702.

The reception module 701 is used for receiving a configuration message sent by a network, wherein the configuration message includes cell configuration information and trigger condition information.

The configuration module 702 is used for: in a case that the terminal meets the trigger condition information, using the cell configuration information to perform cell configuration.

Optionally, the configuration message includes: one or more pieces of cell configuration information, and one or more pieces of trigger condition information.

The configuration module 702 is used for: in a case that the terminal meets at least one piece of trigger condition information, using the cell configuration information corresponding to the at least one piece of trigger condition information to perform cell configuration Optionally, the configuration message includes a trigger condition information list, a cell configuration information list, and an association relation list, wherein the trigger condition information list includes one or more pieces of trigger condition information, the cell configuration information list includes one or more pieces of cell configuration information, and the association relation list includes an association relation between the trigger condition information and the cell configuration information; or the configuration message includes a trigger condition list, wherein each item in the trigger condition list includes the trigger condition information and the cell configuration information corresponding to the trigger condition information.

Optionally, each item in the trigger condition information list includes trigger condition information and identification information corresponding to the trigger condition information; each item in the cell configuration information list includes cell configuration information and identification information corresponding to the cell configuration information.

The association relation includes: an association relation between the identification information corresponding to the trigger condition information and the identification information corresponding to the cell configuration information; or an association relation between the identification information corresponding to the trigger condition information and an item label of the cell configuration information list; an association relation between an item label of the trigger condition information list and identification information corresponding to the cell configuration information; or an association relation between an item label of the trigger condition information list and an item label of the cell configuration information list.

Optionally, the trigger condition list includes at least one of the following: a first condition item, a second condition item and a third condition item.

The first condition item includes one piece of trigger condition information and one piece of cell configuration information corresponding to the piece of trigger condition information; the second condition item includes one piece of trigger condition information and multiple pieces of cell configuration information corresponding to the piece of trigger condition information; or the third condition item includes one piece of cell configuration information and one or more pieces of trigger condition information corresponding to the piece of cell configuration information.

Optionally, the configuration message has at least one of the following configurations: trigger condition information of different items in the trigger condition information list being configured in different information containers, respectively; cell configuration information of different items in the cell configuration information list being configured in different information containers, respectively; trigger condition information of different items in the trigger condition list being configured in different information containers, respectively; cell configuration information of different items in the trigger condition list being configured in different information containers, respectively; contents of different items in the trigger condition list being configured in different information containers, respectively and the contents include the trigger condition information and the cell configuration information corresponding to the trigger condition information.

Optionally, the reception module 701 is used for receiving the configuration message sent by the source node; or the reception module 701 is used for receiving the configuration message sent by the target node through the source node.

The terminal provided by the embodiment of the present disclosure can implement the various processes implemented by the terminal in the method embodiments of FIG. 2 and FIG. 3. To avoid repetition, details thereof are not repeated here, and a cell of the terminal can be flexibly configured to improve the communication performance of the terminal.

Figure 8:
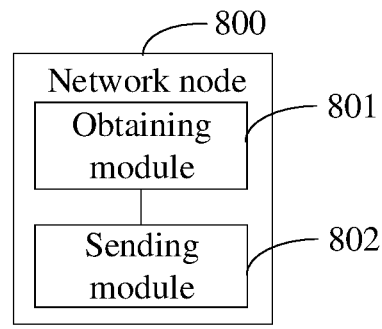
FIG. 8 is a structural diagram of a network node provided by an embodiment of the present disclosure.

Referring to FIG. 8. FIG. 8 is a structural diagram of a network node provided by an embodiment of the present disclosure. The network node is a source node or a target node. As shown in FIG. 8, the network node 800 includes an obtaining module 801 and a sending module 802.

The obtaining module 801 is used for obtaining cell configuration information and trigger condition information.

The sending module 802 is used for sending a configuration message to the terminal, wherein the configuration message includes the cell configuration information and the trigger condition information.

Optionally, the configuration message includes: one or more pieces of cell configuration information and one or more pieces of trigger condition information.

Optionally, the configuration message includes a trigger condition information list, a cell configuration information list, and an association relation list, wherein the trigger condition information list includes one or more pieces of trigger condition information, and the cell configuration information list includes one or more pieces of cell configuration information, and the association relation list includes an association relation between the trigger condition information and the cell configuration information; or the configuration message includes a trigger condition list, wherein each item in the trigger condition list includes trigger condition information and cell configuration information corresponding to the trigger condition information.

Optionally, each item in the trigger condition information list includes trigger condition information and identification information corresponding to the trigger condition information; each item in the cell configuration information list includes cell configuration information and identification information corresponding to the cell configuration information.

The association relation includes: an association relation between the identification information corresponding to the trigger condition information and the identification information corresponding to the cell configuration information; or an association relation between the identification information corresponding to the trigger condition information and an item label of the cell configuration information list; or an association relation between an item label of the trigger condition information list and identification information corresponding to the cell configuration information; or an association relation between an item label of the trigger condition information list and an item label of the cell configuration information list.

Optionally, the trigger condition list includes at least one of the following: a first condition item, a second condition item and a third condition item, wherein, the first condition item includes one piece of trigger condition information and one piece of cell configuration information corresponding to the piece of trigger condition information; the second condition item includes one piece of trigger condition information and multiple pieces of cell configuration information corresponding to the piece of trigger condition information; or the third condition item includes one piece of cell configuration information and one or more pieces of trigger condition information corresponding to the piece of cell configuration information.

Optionally, the configuration message has at least one of following configurations: trigger condition information of different items in the trigger condition information list being configured in different information containers, respectively; cell configuration information of different items in the cell configuration information list being configured in different information containers, respectively; trigger condition information of different items in the trigger condition list being configured in different information containers, respectively; cell configuration information of different items in the trigger condition list being configured in different information containers, respectively; contents of different items in the trigger condition list being configured in different information containers, respectively and the contents include the trigger condition information and the cell configuration information corresponding to the trigger condition information.

Optionally, in a case that the network node is the target node, the cell configuration information and the trigger condition information are determined through negotiation between the target node and the source node; or in the case where the network node is the source node, the cell configuration information and the trigger condition information are determined by the source node and one or more target nodes through negotiation.

Optionally, in a case that the network node is the target node, the target node sends the configuration message to the terminal through the source node.

The network node provided by the embodiment of the present disclosure can implement each process implemented by the source node or the target node in the method embodiment of FIG. 4. To avoid repetition, description thereof will not be repeated here, and a cell of the terminal can be flexibly configured to improve the communication performance of the terminal.

Figure 9:
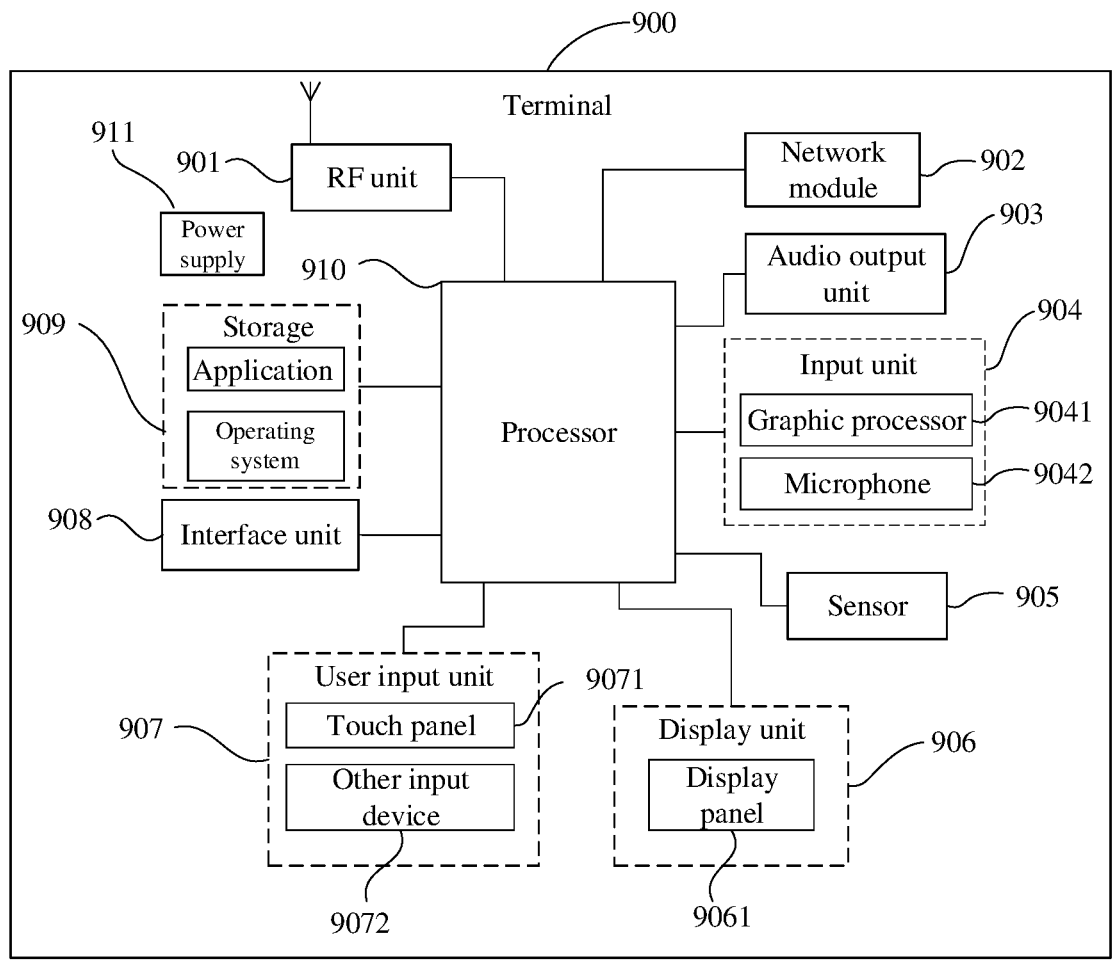
FIG. 9 is a structural diagram of another terminal provided by an embodiment of the present disclosure.

FIG. 9 is a schematic diagram of a hardware structure of a terminal implementing various embodiments of the present disclosure.

The terminal 900 includes, but is not limited to, a radio frequency unit 901, a network module 902, an audio output unit 903, an input unit 904, a sensor 905, a display unit 906, a user input unit 907, an interface unit 908, a storage 909, a processor 910, and a power supply 911 and other components. Those skilled in the art may understand that the structure of the terminal shown in FIG. 9 does not form a limitation of the terminal, the terminal may include more or fewer components than shown in the figure, or some combined components, or different arrangements of components. In some embodiments of the present disclosure, the terminal includes, but is not limited to, a mobile phone, a tablet computer, a notebook computer, a palmtop computer, a vehicle-mounted terminal, a wearable device, a pedometer, and the like.

The radio frequency unit 901 is used for receiving a configuration message sent by the network, wherein the configuration message includes cell configuration information and trigger condition information.

The processor 910 is used for: in a case that the terminal meets the trigger condition information, using the cell configuration information to perform the cell configuration.

Optionally, the configuration message includes one or more pieces of cell configuration information and one or more pieces of trigger condition information.

In a case that the terminal meets the trigger condition information, using the cell configuration information to perform the cell configuration, performed by the processor 910, includes: in a case that the terminal meets at least one piece of trigger condition information, using the cell configuration information corresponding to the at least one piece of trigger condition information to perform the cell configuration.

Optionally, the configuration message includes a trigger condition information list, a cell configuration information list, and an association relation list, wherein the trigger condition information list includes one or more pieces of trigger condition information, the cell configuration information list includes one or more pieces of cell configuration information, and the association relation list includes an association relation between the trigger condition information and the cell configuration information; or the configuration message includes a trigger condition list, wherein each item in the trigger condition list includes the trigger condition information and the cell configuration information corresponding to the trigger condition information.

Each item in the trigger condition information list includes trigger condition information and identification information corresponding to the trigger condition information; each item in the cell configuration information list includes cell configuration information and identification information corresponding to the cell configuration information.

The association relation includes: an association relation between the identification information corresponding to the trigger condition information and the identification information corresponding to the cell configuration information; or an association relation between the identification information corresponding to the trigger condition information and an item label of the cell configuration information list; an association relation between an item label of the trigger condition information list and identification information corresponding to the cell configuration information; or an association relation between an item label of the trigger condition information list and an item label of the cell configuration information list.

Optionally, the trigger condition list includes at least one of the following: a first condition item, a second condition item and a third condition item.

The first condition item includes one piece of trigger condition information and one piece of cell configuration information corresponding to the piece of trigger condition information; the second condition item includes one piece of trigger condition information and multiple pieces of cell configuration information corresponding to the piece of trigger condition information; or the third condition item includes one piece of cell configuration information and one or more pieces of trigger condition information corresponding to the piece of cell configuration information.

Optionally, the configuration message has at least one of the following configurations: trigger condition information of different items in the trigger condition information list being configured in different information containers, respectively; cell configuration information of different items in the cell configuration information list being configured in different information containers, respectively; trigger condition information of different items in the trigger condition list being configured in different information containers, respectively; cell configuration information of different items in the trigger condition list being configured in different information containers, respectively; contents of different items in the trigger condition list being configured in different information containers, respectively and the contents include the trigger condition information and the cell configuration information corresponding to the trigger condition information.

Optionally, receiving the configuration message sent by the network performed by the radio frequency unit 90 includes: receiving the configuration message sent by the source node; or receiving the configuration message sent by the target node through the source node.

The terminal may flexibly configure a cell of the terminal so as to improve a communication performance of the terminal.

It should be understood that, in the embodiment of the present disclosure, the radio frequency unit 901 may be used for receiving and transmitting signals in processes of transmitting and receiving information or talking. Specifically, after the radio frequency unit 901 receives downlink data from the base station, and the downlink data is transferred by the radio frequency unit 901 to the processor 910 for processing; and additionally the radio frequency unit 901 sends uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may also communicate with a network and other devices through a wireless communication system.

The terminal provides a wireless broadband internet access to a user through the network module 902, such as helping the user to send and receive emails, browse web pages, access streaming media, and the like.

The audio output unit 903 may convert audio data received by the radio frequency unit 901 or the network module 902 or stored in the storage 909 into an audio signal and output the audio signal as sound. The audio output unit 903 may also provide audio output (e.g., a call signal reception sound, a message reception sound, etc.) related to a specific function performed by the terminal 900. The audio output unit 903 includes a speaker, a buzzer, a receiver, and the like.

The input unit 904 is used to receive an audio or video signal. The input unit 904 may include a graphic processor (Graphics Processing Unit, GPU) 9041 and a microphone 9042. The graphics processor 9041 processes image data of a still picture or a video obtained by an image capturing device such as a camera in a video capturing mode or an image capturing mode. The processed image frame may be displayed on the display unit 906. Image frames processed by the graphics processor 9041 may be stored in the storage 909 (or other storage media) or sent via the radio frequency unit 901 or the network module 902. The microphone 9042 may receive sound and be able to process such sound into audio data. The processed audio data may be converted, in a case of a telephone communication mode, into a format output that may be sent to a mobile communications base station via the radio frequency unit 901.

The terminal 900 also includes at least one sensor 905, such as a light sensor, a motion sensor, and other sensors. In particular, the light sensor includes an ambient light sensor and a proximity sensor, wherein the ambient light sensor may adjust brightness of the display panel 9061 according to brightness of ambient light. The proximity sensor may turn off the display panel 9061 and/or a backlight when the terminal 900 moves close to the ear. As one type of motion sensor, the accelerometer sensor can detect a value of an acceleration in each direction (generally the three axes directions), and can detect a magnitude and a direction of gravity when being stationary, can be used to recognize a posture of a mobile terminal (such as horizontal-vertical screen switching, a related game, a magnetometer posture calibration), a vibration-recognition related function (such as a pedometer, tapping), and the like. The sensor 905 may further include a fingerprint sensor, a pressure sensor, an iris sensor, a molecular sensor, a gyroscope, a barometer, a hygrometer, a thermometer, an infrared sensor, and the like, which will not be described herein.

The display unit 906 is used to display information inputted by the user or information provided to the user. The display unit 906 may include a display panel 9061 that may be configured in the form of a liquid crystal display (Liquid Crystal Display, LCD), an organic light-emitting diode (Organic Light-Emitting Diode, OLED), or the like.

The user input unit 907 may be used to receive inputted digital or character information and generate a key signal input related to user-setting and function control of the terminal. Specifically, the user input unit 907 includes a touch panel 9071 and other input devices 9072. The touch panel 9071, also referred to as a touch screen, may collect a touch operation (e.g., an operation of a user using any suitable object or accessory, such as a finger, stylus, or the like, on or near the touch panel 9071) of the user on or near the touch panel 9071. The touch panel 9071 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 910, and receives and executes commands from the processor 910. In addition, the touch panel 9071 may be implemented in various types such as a resistance type, a capacitance type, an infrared ray, and a surface acoustic wave. The user input unit 907 may also include other input devices 9072 in addition to the touch panel 9071. Specifically, the other input devices 9072 may include, but are not limited to, a physical keyboard, function keys (such as volume control keys, switch keys, etc.), a trackball, a mouse, and a joystick, which will not be described herein.

Further, the touch panel 9071 may be overlaid on the display panel 9061, and after the touch panel 9071 detects a touch operation on or near the touch panel 9071, the touch operation is sent by touch panel 9071 to the processor 910 to determine the type of a touch event. The processor 910 then provides a corresponding visual output on the display panel 9061 according to the type of the touch event. Although in FIG. 9, the touch panel 9071 and the display panel 9061 are two separate components for implementing input and output functions of the terminal, the input and output functions of the terminal in some embodiments may be realized by integrating the touch panel 9071 with the display panel 9061, and the present disclosure is not limited thereto.

The interface unit 908 is an interface in which an external device is connected to the terminal 900. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 908 may be used to receive input (e.g., data information, power, etc.) from an external device and transmit the received input to one or more elements within the terminal 900 or may be used to transmit data between the terminal 900 and the external device.

The storage 909 may be used to store software programs and various types of data. The storage 909 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 909 may include a high speed random access memory, and may also include a non-transitory memory, such as at least one disk storage device, a flash memory device, or other volatile solid state storage device.

The processor 910 is a console of the terminal, connects various parts of the entirety of the terminal using various interfaces and lines, and executes various functions and processes data of the terminal by running or executing software programs and/or modules stored in the storage 909, and by calling data stored in the storage 909, thereby integrally monitoring the terminal. The processor 910 may include one or more processing units; optionally, the processor 910 may integrate an application processor and a modem processor, wherein the application processor primarily processes an operating system, a user interface, an application program, etc. The modem processor mainly handles wireless communication. It will be appreciated that the above-described modem processor may also not be integrated into the processor 910.

The terminal 900 may also include a power supply 911 (such as a battery) that supplies power to various components, optionally, the power supply 911 may be logically connected to the processor 910 via a power management system. Thus, functions such as charging, discharging, and power consumption management are managed by the power management system.

In addition, the terminal 900 includes some functional modules not shown, which will not be described here.

Optionally, an embodiment of the present disclosure further provides a terminal. The terminal includes a processor 910, a storage 909, a computer program stored in the storage 909 and executable by the processor 910, wherein when the computer program is executed by the processor 910, each process of the foregoing embodiments of the cell configuration method is realized, and the same technical effect can be achieved. In order to avoid repetition, details thereof are not repeated here.

Figure 10:
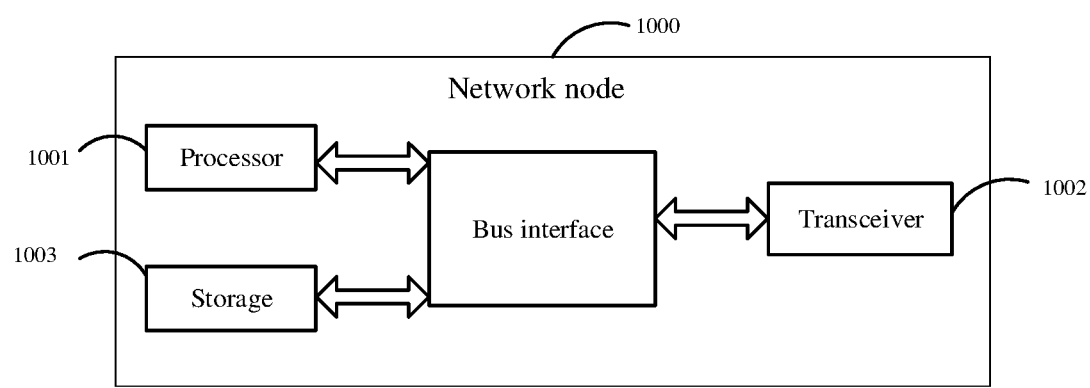
FIG. 10 is a structural diagram of another network node provided by an embodiment of the present disclosure.

Referring to FIG. 10, FIG. 10 is a structural diagram of another network node provided by an embodiment of the present disclosure. The network node may be a source node or a target node. As shown in FIG. 10, the network node 1000 includes a processor 1001, a transceiver 1002, a storage 1003 and a bus interface, wherein the transceiver 1002 is used for obtaining cell configuration information and trigger condition information; and sending a configuration message to a terminal, wherein the configuration message includes the cell configuration information and the trigger condition information.

Optionally, the configuration message includes: one or more pieces of cell configuration information and one or more pieces of trigger condition information.

Optionally, the configuration message includes a trigger condition information list, a cell configuration information list, and an association relation list, wherein the trigger condition information list includes one or more pieces of trigger condition information, and the cell configuration information list includes one or more pieces of cell configuration information, and the association relation list includes an association relation between the trigger condition information and the cell configuration information; or the configuration message includes a trigger condition list, wherein each item in the trigger condition list includes trigger condition information and cell configuration information corresponding to the trigger condition information.

Optionally, each item in the trigger condition information list includes trigger condition information and identification information corresponding to the trigger condition information; each item in the cell configuration information list includes cell configuration information and identification information corresponding to the cell configuration information.

The association relation includes: an association relation between the identification information corresponding to the trigger condition information and the identification information corresponding to the cell configuration information; or an association relation between the identification information corresponding to the trigger condition information and an item label of the cell configuration information list; or an association relation between an item label of the trigger condition information list and identification information corresponding to the cell configuration information; or an association relation between an item label of the trigger condition information list and an item label of the cell configuration information list.

Optionally, the trigger condition list includes at least one of the following: a first condition item, a second condition item and a third condition item, wherein, the first condition item includes one piece of trigger condition information and one piece of cell configuration information corresponding to the piece of trigger condition information; the second condition item includes one piece of trigger condition information and multiple pieces of cell configuration information corresponding to the piece of trigger condition information; or the third condition item includes one piece of cell configuration information and one or more pieces of trigger condition information corresponding to the piece of cell configuration information.

Optionally, the configuration message has at least one of following configurations: trigger condition information of different items in the trigger condition information list being configured in different information containers, respectively; cell configuration information of different items in the cell configuration information list being configured in different information containers, respectively; trigger condition information of different items in the trigger condition list being configured in different information containers, respectively; cell configuration information of different items in the trigger condition list being configured in different information containers, respectively; contents of different items in the trigger condition list being configured in different information containers, respectively and the contents include the trigger condition information and the cell configuration information corresponding to the trigger condition information.

Optionally, in a case that the network node is the target node, the cell configuration information and the trigger condition information are determined through negotiation between the target node and the source node; or in the case where the network node is the source node, the cell configuration information and the trigger condition information are determined by the source node and one or more target nodes through negotiation.

Optionally, in a case that the network node is the target node, the target node sends the configuration message to the terminal through the source node.

The network node may flexibly configure a cell of a terminal, so as to improve a communication performance of the terminal.

The transceiver 1002 is used for receiving and sending data under a control of the processor 1001. The transceiver 1002 includes at least two antenna ports.

In FIG. 10, a bus architecture may include any number of interconnected buses and bridges, specifically various circuits such as one or more processors represented by the processor 1001 and a memory represented by the storage 1003 are linked together. The bus architecture may also link together various other circuits, such as peripheral devices, voltage regulators, and power management circuits, which are well known in the art, and thus will not be described further herein. The bus interface provides an interface. The transceiver 1002 may be a plurality of elements, i.e., including a transmitter and a receiver, for providing elements for communicating with various other devices over a transmission medium. For different user equipments, the user interface 1004 may also be an interface capable of internally or externally connecting a necessary device. A connected device includes, but is not limited to, a keypad, a display, a microphone, a speaker, a joystick, and the like.

The processor 1001 is responsible for managing the bus architecture and general processing, and the storage 1003 may store data used by the processor 1001 when performing operations.

Optionally, an embodiment of the present disclosure further provides a network node. The network node includes a processor 1001, a storage 1003, a computer program stored in the storage 1003 and executable by the processor 1001, wherein when the computer program is executed by the processor 1001, each process of the foregoing embodiments of the cell configuration method is realized, and the same technical effect can be achieved. In order to avoid repetition, details thereof are not repeated here.

The embodiments of the present disclosure also provide a computer readable storage medium, and a computer program is stored on the computer readable storage medium. When the computer program is executed by a processor, each process of the above embodiments of the cell configuration method at a terminal side provided in the embodiments of the present disclosure is realized, or when the computer program is executed by a processor, each process of the above embodiments of the cell configuration method at the source node side or at the target node side provided in the embodiments of the present disclosure is implemented, and the same technical effect can be achieved. To avoid repetition, description thereof is not repeated here. The computer readable storage medium is such as a read-only memory (Read-Only Memory, ROM), a random access memory (Random Access Memory, RAM), a magnetic disk, or an optical disk, etc.

It should be noted that such terms as "including", "comprising" or any other variation thereof herein are intended to encompass non-exclusive inclusions such that a process, method, article or device including a series of elements includes not only those elements, but also other elements that are not explicitly listed, or elements inherent to such a process, method, article or user equipment. An element after a statement "including" does not exclude presence of further identical elements in the process, method, article or device that includes the element, if without further limitation.

Through description of the above embodiments, those skilled in the art can clearly understand that the method of the above embodiments can be implemented by means of software plus a necessary general hardware platform, but of course, can also be implemented by hardware, but in many cases the former is better implementation. Based on this understanding, the essential part of the technical solutions of the present disclosure or a part that contributes to the related art can be embodied in the form of a software product. The computer software product is stored in a storage medium (such as a ROM/RAM, a magnetic disk, an optical disk) and includes several instructions to make a terminal (which can be a mobile phone, a computer, a server, an air-conditioner, or a network device, etc.) execute the methods described in the various embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Those of ordinary skill in the art, under enlightenment of the present disclosure, may make many forms without departing from the principle of the present disclosure and the protection scope of the claims, all of which fall within the protection scope of the present disclosure.

What is claimed is:

1. A non-transitory computer readable storage medium having a computer program stored on the computer readable storage medium, wherein, when the computer program is executed by a processor, the processor implements a cell configuration method applied to a terminal, the method comprises:
receiving a configuration message sent by a network, wherein the configuration message comprises cell configuration information and trigger condition information;
using the cell configuration information to perform cell configuration, in a case that the terminal meets the trigger condition information,
wherein,
the configuration message comprises a trigger condition information list, a cell configuration information list, and an association relation list, wherein the trigger condition information list comprises one or more pieces of trigger condition information, the cell configuration information list comprises one or more pieces of cell configuration information, and the association relation list comprises an association relation between the trigger condition information and the cell configuration information,
wherein,
trigger condition information of different items in the trigger condition information list is configured in different information containers, respectively; or
cell configuration information of different items in the cell configuration information list is configured in different information containers, respectively;
or
the configuration message comprises a trigger condition list, wherein each item in the trigger condition list comprises the trigger condition information and cell configuration information corresponding to the trigger condition information,
wherein,
trigger condition information of different items in the trigger condition list is configured in different information containers, respectively; or
cell configuration information of different items in the trigger condition list is configured in different information containers, respectively; or
contents of different items in the trigger condition list are configured in different information containers, respectively, the contents comprise the trigger condition information and the cell configuration information corresponding to the trigger condition information.

2. The non-transitory computer readable storage medium according to claim 1, wherein, using the cell configuration information to perform cell configuration in a case that the terminal meets the trigger condition information comprises:
in a case that the terminal meets at least one piece of trigger condition information, using cell configuration information corresponding to the at least one piece of trigger condition information to perform the cell configuration.

3. The non-transitory computer readable storage medium according to claim 1, wherein, in case that the configuration message comprises the trigger condition information list, each item in the trigger condition information list comprises trigger condition information and identification information corresponding to the trigger condition information;
each item in the cell configuration information list comprises cell configuration information and identification information corresponding to the cell configuration information;
the association relation comprises:
an association relation between the identification information corresponding to the trigger condition information and the identification information corresponding to the cell configuration information; or
an association relation between the identification information corresponding to the trigger condition information and an item label of the cell configuration information list;
an association relation between an item label of the trigger condition information list and the identification information corresponding to the cell configuration information; or
an association relation between an item label of the trigger condition information list and an item label of the cell configuration information list.

4. The non-transitory computer readable storage medium according to claim 1, wherein, in case that the configuration message comprises the trigger condition list, the trigger condition list comprises at least one of following: a first condition item, a second condition item and a third condition item;
wherein, the first condition item comprises one piece of trigger condition information and one piece of cell configuration information corresponding to the piece of trigger condition information;
the second condition item comprises one piece of trigger condition information and multiple pieces of cell configuration information corresponding to the piece of trigger condition information; or
the third condition item comprises one piece of cell configuration information and one or more pieces of trigger condition information corresponding to the piece of cell configuration information.

5. The non-transitory computer readable storage medium according to claim 1, wherein receiving the configuration message sent by the network comprises:
receiving the configuration message sent by a source node; or
receiving the configuration message sent by a target node through the source node.

6. A network node, wherein the network node is a source node or a target node, the network node comprises:
a storage, a processor, and a computer program stored on the storage and executable by the processor, wherein when the computer program is executed by the processor, the processor implements a cell configuration method, the method comprises:
obtaining cell configuration information and trigger condition information;
sending a configuration message to a terminal, wherein the configuration message comprises the cell configuration information and the trigger condition information,
wherein,
the configuration message comprises a trigger condition information list, a cell configuration information list, and an association relation list, wherein the trigger condition information list comprises one or more pieces of trigger condition information, the cell configuration information list comprises one or more pieces of cell configuration information, and the association relation list comprises an association relation between the trigger condition information and the cell configuration information
wherein,
trigger condition information of different items in the trigger condition information list is configured in different information containers, respectively; or
cell configuration information of different items in the cell configuration information list is configured in different information containers, respectively;
or
the configuration message comprises a trigger condition list, wherein each item in the trigger condition list comprises trigger condition information and its corresponding cell configuration information,
wherein,
trigger condition information of different items in the trigger condition list is configured in different information containers, respectively; or
cell configuration information of different items in the trigger condition list is configured in different information containers, respectively; or
contents of different items in the trigger condition list are configured in different information containers, respectively, the contents comprise the trigger condition information and cell configuration information corresponding to the trigger condition information.

7. The network node according to claim 6, wherein, in case that the configuration message comprises the trigger condition information list, each item in the trigger condition information list comprises trigger condition information and identification information corresponding to the trigger condition information;
each item in the cell configuration information list comprises cell configuration information and identification information corresponding to the cell configuration information;
the association relation comprises:
an association relation between the identification information corresponding to the trigger condition information and the identification information corresponding to the cell configuration information; or
an association relation between the identification information corresponding to the trigger condition information and an item label of the cell configuration information list;
an association relation between an item label of the trigger condition information list and the identification information corresponding to the cell configuration information; or
an association relation between an item label of the trigger condition information list and an item label of the cell configuration information list.

8. The network node according to claim 6, wherein, in case that the configuration message comprises the trigger condition list, the trigger condition list comprises at least one of following: a first condition item, a second condition item and a third condition item;
wherein, the first condition item comprises one piece of trigger condition information and one piece of cell configuration information corresponding to the piece of trigger condition information;
the second condition item comprises one piece of trigger condition information and multiple pieces of cell configuration information corresponding to the piece of trigger condition information; or
the third condition item comprises one piece of cell configuration information and one or more pieces of trigger condition information corresponding to the piece of cell configuration information.

9. The network node according to claim 6, wherein, in a case that the network node is the target node, the cell configuration information and the trigger condition information are determined through negotiation between the target node and the source node; or
in a case that the network node is the source node, the cell configuration information and the trigger condition information are determined by the source node and one or more target nodes through negotiation.

10. The network node according to claim 6, wherein in a case that the network node is the target node, the target node sends the configuration message to the terminal through the source node.

11. A non-transitory computer readable storage medium having a computer program stored on the computer readable storage medium, wherein, when the computer program is executed by a processor, the processor implements a cell configuration method applied to a source node or a target node, the method comprises:
obtaining cell configuration information and trigger condition information;
sending a configuration message to a terminal, wherein the configuration message comprises the cell configuration information and the trigger condition information,
wherein,
the configuration message comprises a trigger condition information list, a cell configuration information list, and an association relation list, wherein the trigger condition information list comprises one or more pieces of trigger condition information, the cell configuration information list comprises one or more pieces of cell configuration information, and the association relation list comprises an association relation between the trigger condition information and the cell configuration information
wherein,
trigger condition information of different items in the trigger condition information list is configured in different information containers, respectively; or
cell configuration information of different items in the cell configuration information list is configured in different information containers, respectively;
or
the configuration message comprises a trigger condition list, wherein each item in the trigger condition list comprises trigger condition information and its corresponding cell configuration information,
wherein,
trigger condition information of different items in the trigger condition list is configured in different information containers, respectively; or
cell configuration information of different items in the trigger condition list is configured in different information containers, respectively; or
contents of different items in the trigger condition list are configured in different information containers, respectively, the contents comprise the trigger condition information and cell configuration information corresponding to the trigger condition information.

12. The non-transitory computer readable storage medium according to claim 11, wherein, in case that the configuration message comprises the trigger condition information list, each item in the trigger condition information list comprises trigger condition information and identification information corresponding to the trigger condition information;

each item in the cell configuration information list comprises cell configuration information and identification information corresponding to the cell configuration information;

the association relation comprises:
an association relation between the identification information corresponding to the trigger condition information and the identification information corresponding to the cell configuration information; or
an association relation between the identification information corresponding to the trigger condition information and an item label of the cell configuration information list;
an association relation between an item label of the trigger condition information list and the identification information corresponding to the cell configuration information; or
an association relation between an item label of the trigger condition information list and an item label of the cell configuration information list.

13. The non-transitory computer readable storage medium according to claim 11, wherein, in case that the configuration message comprises the trigger condition list, the trigger condition list comprises at least one of following: a first condition item, a second condition item and a third condition item;

wherein, the first condition item comprises one piece of trigger condition information and one piece of cell configuration information corresponding to the piece of trigger condition information;

the second condition item comprises one piece of trigger condition information and multiple pieces of cell configuration information corresponding to the piece of trigger condition information; or the third condition item comprises one piece of cell configuration information and one or more pieces of trigger condition information corresponding to the piece of cell configuration information.

14. The non-transitory computer readable storage medium according to claim 11, wherein, in a case that the method is applied to the target node, the cell configuration information and the trigger condition information are determined through negotiation between the target node and the source node; or in a case that the method is applied to the source node, the cell configuration information and the trigger condition information are determined by the source node and one or more target nodes through negotiation.

15. The non-transitory computer readable storage medium according to claim 11, wherein in a case that the method is applied to the target node, the target node sends the configuration message to the terminal through the source node.

* * * * *